(No Model.)

L. DUSTIN.
MAGAZINE CAMERA.

No. 571,995. Patented Nov. 24, 1896.

Witnesses:
R. F. Osgood.
C. G. Cranwell

Inventor:
L. Dustin.
By G. B. Selden.
Atty.

(No Model.) 2 Sheets—Sheet 2.
L. DUSTIN.
MAGAZINE CAMERA.
No. 571,995. Patented Nov. 24, 1896.
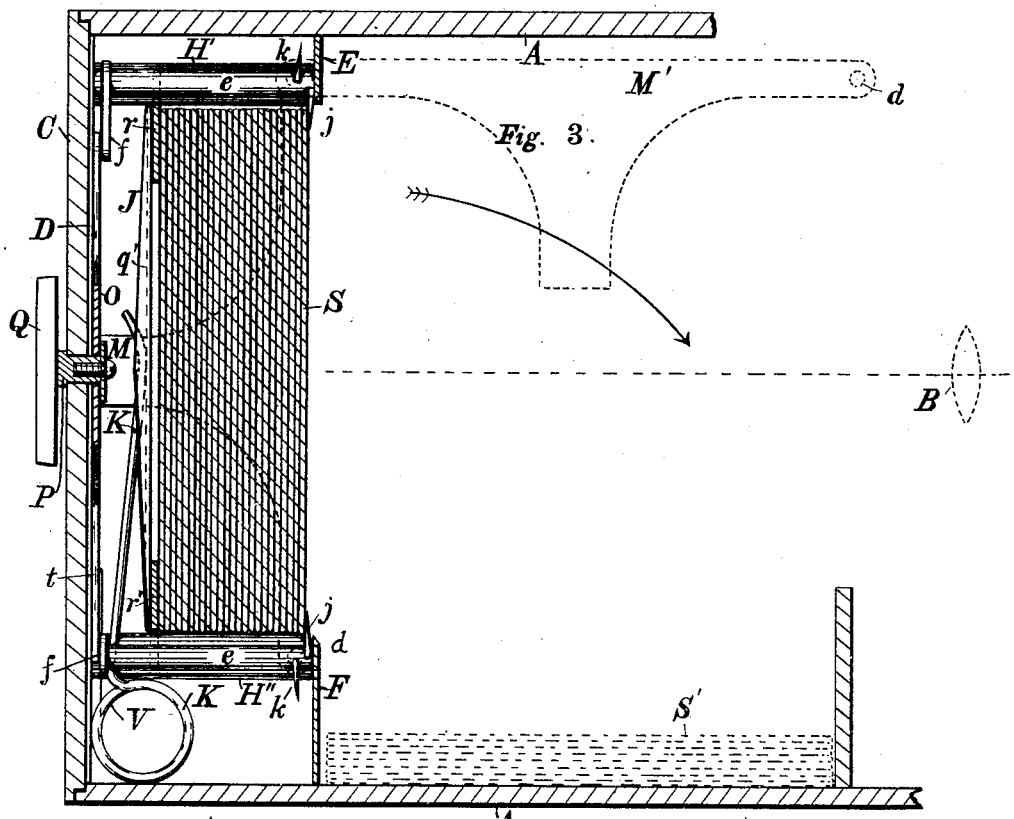
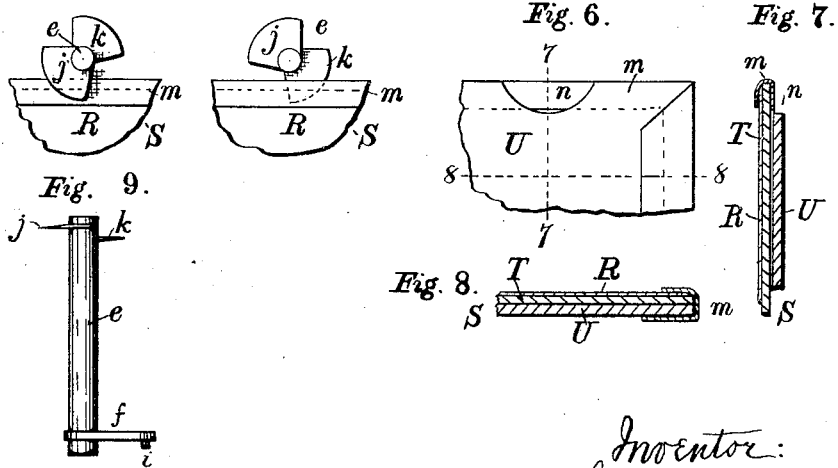
Witnesses:
R. F. Osgood.
C. G. Crannell.
Inventor:
L. Dustin,
By Geo. B. Selden,
atty.

United States Patent Office.

LEANDER DUSTIN, OF ROCHESTER, NEW YORK, ASSIGNOR, BY DIRECT AND MESNE ASSIGNMENTS, TO EZRA R. ANDREWS AND AUGUST L. LEHN- KERING, OF SAME PLACE.

MAGAZINE-CAMERA.

SPECIFICATION forming part of Letters Patent No. 571,995, dated November 24, 1896.

Application filed December 23, 1893. Serial No. 494,560. (No model.)

*To all whom it may concern:*

Be it known that I, LEANDER DUSTIN, a citizen of the United States, residing at Rochester, in the county of Monroe, in the State of New York, have invented certain Improvements in Magazine-Cameras, of which the following is a specification, reference being had to the accompanying drawings.

My invention relates to certain improvements in the construction of magazine-holders for photographic cameras, which improvements are fully described and illustrated in the following specification and the accompanying drawings, the novel features thereof being specified in the claims annexed to the said specification.

Figure 1:
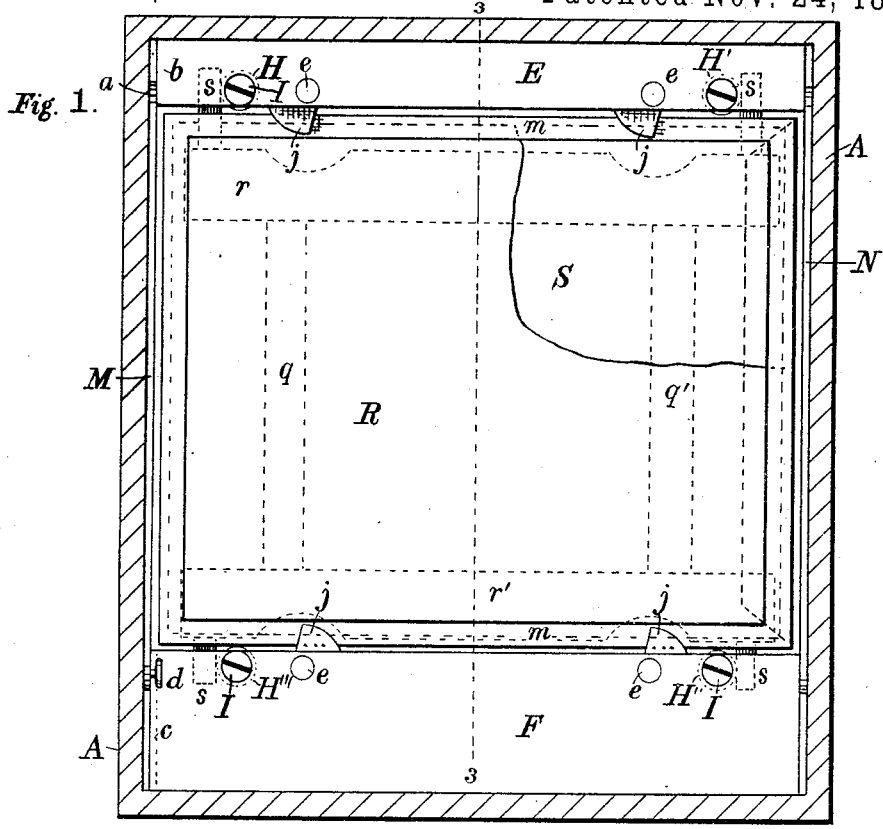
Figure 2:
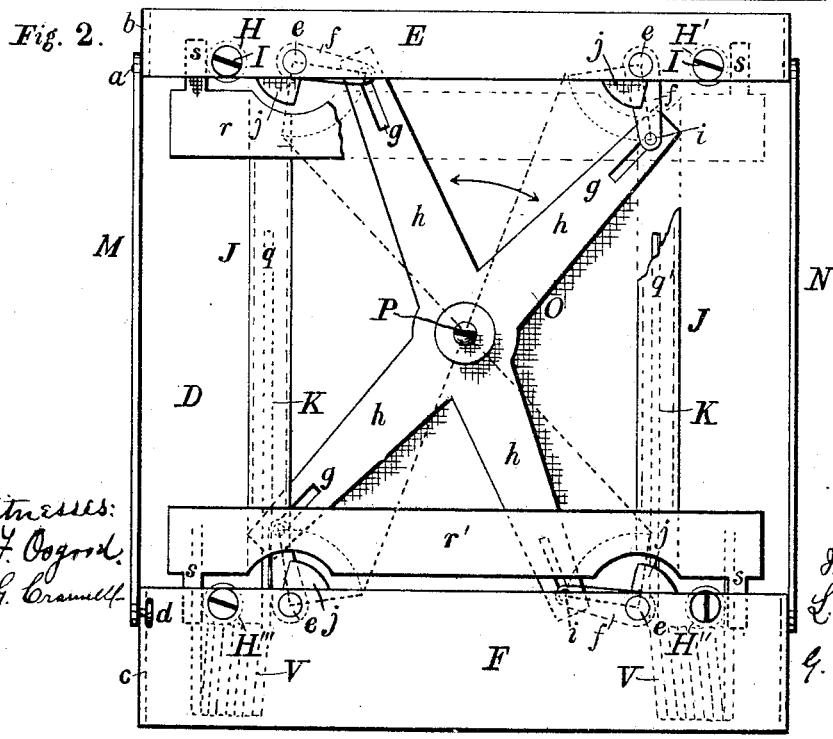

In the accompanying drawings, representing my improvements, Figure 1 is a front elevation of the holder with a film in position for exposure, the casing of the camera being shown in section. Fig. 2 is a front elevation of the holder, the film and carrier being omitted. Fig. 3 is a central longitudinal section through the holder on the line 3 3, Fig. 1, showing the parts to the right hand of said line. Fig. 4 is a front view of the oscillating post and its wings, showing a carrier engaged with the front or delivery wing. Fig. 5 is a front view similar to Fig. 4, the post and wings having been oscillated so that the front wing is disengaged from the foremost carrier, while the rear wing is engaged between the foremost and the second carrier. Fig. 6 is a rear view of a portion of a carrier, showing one of the notches into which the rear wings enter. Fig. 7 is a section of the same on the line 7 7, Fig. 6. Fig. 8 is a section of the same on the line 8 8, Fig. 6. Fig. 9 is a side view of one of the oscillating posts detached.

In the accompanying drawings, A represents the camera-casing, B the lens in the optical axis, and C a removable back or plate attached to the rear end of the camera and to which the magazine-holder is secured. The camera is provided with a focusing arrangement and an exposing-shutter of any suitable or preferred construction.

My improved holder for film or plate carriers consists, essentially, of two parallel plates, the foremost of which is recessed for the passage of the carriers therethrough, a series of oscillating posts provided with delivery and separation wings, an oscillating spider for operating the posts, and a suitable spring mechanism for urging the carriers constantly forward.

D is the rear plate, which is attached to the back C, which is rabbeted into the case or otherwise made light-tight and secured by hinges or spring-catches in any suitable manner. The front plate may be made in one piece, or, as shown in the accompanying drawings, of an upper portion E above the films and a lower portion F below them. The plates are connected together at a suitable distance apart by the bars or struts H H' H" H''', to which the plates are secured in the construction shown by the screws I.

J is a follower which is urged forward against the rear carrier by the spring or springs K.

Provision is made for inserting the carriers, when the holder is detached from the camera, by a pivoted or sliding door or wall M, which may be detached or swung outward, as represented by the dotted lines M', Fig. 3, so that, the follower being pushed back, the carriers may be placed in the holder.

In the particular construction shown the door M is hinged at $a$ to a flange $b$, bent inward from the plate E and secured to a similar flange $c$ on the plate F by a suitable catch or button $d$. On the opposite side the carriers are guided laterally by the wall N, attached to flanges bent inward from the plates E and F.

$e\ e$ represent the oscillating posts, the ends of which are inserted in openings in the plates E and F, so as to turn freely therein. Each post is provided with an arm $f$, carrying a pin or stud $i$, which engages in a slot $g$ in the arms $h$ of the spider O.

P is a central stud, to which the spider is attached, passing through the rear plate D and the back C and provided outside the camera with a handle Q, by which an oscillating movement is given to the spider first in one direction and then in the other. This movement is transmitted to the posts $e$ by the arms $f$, the studs $i$ sliding in the slots $g$.

These movements are represented in Fig. 2 by dotted lines. Suitable stops may be employed on the plate D to limit the oscillating movements of the spider, or such stops may be placed outside in suitable relation with the handle Q. The posts $e$ $e$ receive an oscillating movement from the spider of about a quarter of a revolution. Immediately inside the plates E and F the posts are provided with the projecting delivery-wings $j$, and at a short distance in rear of such delivery-wings with the separating-wings $k$. The arrangement is such that as the front or delivery wings $j$ are disengaged from in front of the foremost carrier S the separating-wings $k$ engage between the foremost carrier and the second or next one and prevent its being forced forward by the springs until the posts are oscillated in the opposite direction, when the carrier is disengaged from the separating-wings and is pressed forward against the delivery-wings, becoming thus the foremost of the lot and ready for another exposure. As soon as released from the delivery-wings the carrier falls forward by gravity to the receptacle for exposed films, face downward, as represented at S', Fig. 3. The operation is repeated for the successive plates by simply turning the handle Q first in one direction and then in the other.

Any suitable form of carriers may be employed in connection with my improved holder. The edges of the wings are sharpened, so that they readily enter between the carriers, and the points of the delivery and separating wings are so placed relatively to each other that the points of the delivery-wings pass over the edges of the carriers before the points of the separating-wings are entirely disengaged therefrom, thus preventing the possibility of the premature discharge of a carrier. Any suitable device may be employed to hold the carriers containing the exposed films in position at S'.

The form of carrier which I prefer to use in my holder is represented in Figs. 7, 8, and 9. It consists of a card T of a suitable size, having a marginal strip of paper or other suitable material $m$ attached around its rear edges and folded over so as to inclose the edges of the film R. On the rear side of the card T is attached another card, U, of corresponding size, but provided on its edges with the notches $n$, arranged in such positions as to receive the separating-wings $k$. The notches form recesses in the edges of a package of films, into which the wings $k$ enter freely, thus facilitating the separation of the foremost card.

The follower J is constructed in any suitable manner, being provided with projecting lugs or guides $s$, which bear against the struts H H' H'' H''', or otherwise arranged so as to move in the proper course. In the construction shown the follower consists of the crossbars $q$ $q'$ and the transverse bars or bearing-pieces $r$ $r'$. The bars $q$ $q'$ are turned up or flanged on their edges to form guides for the free ends of the spring K. These springs are formed with a series of coils V, which secure the requisite range of movement with substantial uniformity of pressure. The ends of the springs are inserted in or attached to the plate D at $t$, Fig. 3.

I do not claim the carrier herein described, such carrier having been invented by Edgar E. Ellis.

It will be understood that three oscillating posts may be employed in connection with the spider herein described, two on one side of the carrier and one on the other.

I claim—

1. The combination, in a magazine-holder, of a suitable supporting-frame, a series of oscillating posts provided with radial arms and offset delivery and separation wings, means for urging the carriers forward, and an oscillating spider connected with said arms by crank-arms $f$ having each a pin $i$ said pins entering and being guided by slots $g$, substantially as described.

2. The combination, in a magazine-holder, of a suitable supporting-frame, a series of oscillating posts provided with radial arms and with offset delivery and separation wings, the oscillating spider connected with said arms, the follower J and coiled spring K, said follower consisting of cross-bars and transverse bearing-pieces, said bars being flanged at their edges to form guides for the free ends of the spring, substantially as described.

3. The combination, in a magazine-holder, of the oscillating post $e$, provided with arm $f$ and offset delivery and separation wings $j$ $k$ provided with sharpened edges, the oscillating arm $h$, and carriers provided with notches $n$ situated near their edges adjacent the faces of other carriers, said notches being adapted to receive the sharpened end of the separating-wings, substantially as described.

4. The combination, in a magazine-holder, of the oscillating post $e$, provided with arm $f$ and offset delivery and separation wings $j$ $k$, the oscillating arm $h$, and a slotted connection between the arms, substantially as described.

5. The combination in a magazine-holder, of a supporting-frame consisting of plates connected by studs, a series of oscillating parts provided with radial arms and with offset delivery and separation wings, the oscillating spider connected with the arms to secure simultaneous movement of the parts, the follower J, and the spring K, said follower having lugs guided by said studs and comprising bars $q$ $q'$ and bearing-pieces $r$ $r'$, said bars being flanged to guide the free end of the spring, substantially as described.

LEANDER DUSTIN.

Witnesses:
GEO. B. SELDEN,
C. G. CRANNELL.